M. BRESLIN.
Galvanic Batteries.
No. 149,635. Patented April 14, 1874.
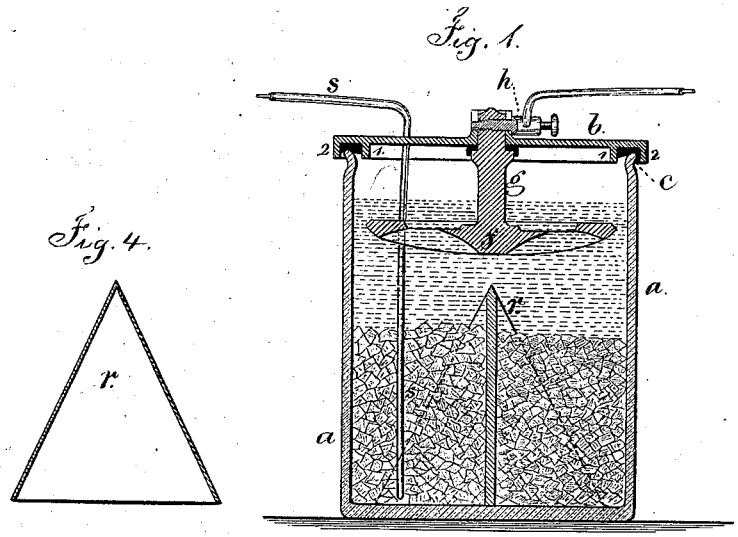
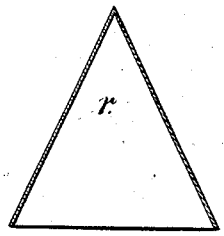
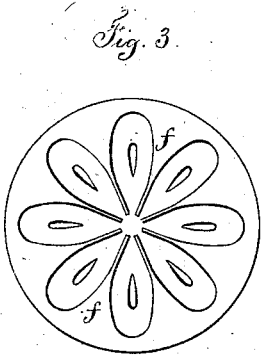
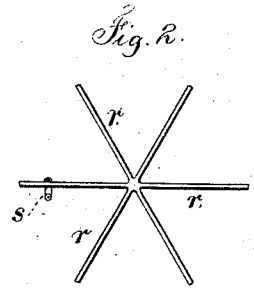
Witnesses
Chas H. Smyth
Harold Serrell
Inventor
Michael Breslin
per Lemuel W. Serrell
Atty.

UNITED STATES PATENT OFFICE.

MICHAEL BRESLIN, OF NEW YORK, N. Y.

IMPROVEMENT IN GALVANIC BATTERIES.

Specification forming part of Letters Patent No. 149,635, dated April 14, 1874; application filed November 4, 1873.

*To all whom it may concern:*

Be it known that I, MICHAEL BRESLIN, of the city and State of New York, have invented an Improvement in Galvanic Batteries, of which the following is a correct specification:

Galvanic batteries are extensively used in which the copper or negative metal is at or near the bottom of a glass jar or cell, and around this the sulphate-of-copper crystals are introduced. These crystals in themselves interfere with the electric action between the metals of the battery-cells, especially when first introduced, but the metallic surfaces usually being clean or free from oxide, the battery is more powerful when first charged, and the power diminishes as the sulphate of copper is precipitated, and the crystals dissolved; hence the power of the battery grows weaker.

The copper plate of the battery-cell is made of a conical or pyramidal form, for the purpose of rendering the action of the battery more uniform than heretofore. I find that the greatest deposit of copper, and the place where the copper pole is most strongly excited, is near the place of union of the sulphate-of-copper and zinc solutions, and that as the sulphate of copper is consumed and lessens in quantity the power of the battery lessens, because the distance between the copper solution and the zinc pole is increased. In consequence of this the battery power is generally too strong when the cells are first charged, and grows weaker as the solution is consumed. I equalize these operations by making the copper pole conical or pyramidal, so that the surface upon which the acid solutions act increases in area as the copper solution subsides. Thereby the increase of energy tends to counteract the resistance due to the increased distance between the copper solution and the zinc pole.

My improvement is to be distinguished from batteries where a coiled strip of copper is used, and the operative surface is not increased as the sulphate of copper is consumed.

In the drawing, Fig. 1 is a vertical section of the battery. Fig. 2 is a plan of the copper pole, and Fig. 3 is an inverted plan of the zinc pole, and Fig. 4 is a section of a modification of the copper pole.

The glass jar or cell $a$ is of usual character. It is provided with a metallic cover, $b$, having annular ribs 1 and 2, between which is the rubber ring $c$, that rests upon the upper edge of the glass, and excludes dust, as well as lessening evaporation from the solution. The disk $f$, of zinc, is suspended from this cover by the bar $g$, that passes through a hole in the center of the cover, and receives the screw-pin $h$ that forms a binder for the battery-wire. This pin $h$ has a screw-thread near one end, and the hole in $g$ is large enough to receive that pin, except where the screw-thread is formed near one end of the hole. This secures the pin, but allows easy removal by a few turns of the screw.

The zinc pole $f$ is made rounding or convex upon the under side, so that bubbles of gas will rise and not accumulate and obstruct the action of the battery; and there are also openings through the disk, and the openings are tapering, as shown, so that there will be an escape for all bubbles of gas, but the zinc can be made as heavy and solid as possible. This positive pole may be made of any metal of suitable character, and furnishes a large extent of surface. The copper pole $r$ is made of sheet metal, having a conical or pyramidal form. It may be hollow, as seen in Fig. 4, but it is generally preferable to make it of triangular plates, united so as to stand radially, and the conductor $s$ is connected with them and passes out through the cover to the binding-screw $h$ of the next cell, or to the circuit-wire.

The operation of this character of copper pole has been fully set forth hereinbefore.

I claim as my invention—

The copper or negative plate made in a conical or pyramidal form, as set forth, whereby the operative surface is increased as the sulphate of copper is consumed, as specified.

Signed by me this 31st day of October A. D. 1873.

MICHAEL BRESLIN.

Witnesses:
   GEO. T. PINCKNEY,
   CHAS. H. SMITH.